US010378752B1

(12) United States Patent
Smith

(10) Patent No.: US 10,378,752 B1
(45) Date of Patent: Aug. 13, 2019

(54) INTEGRATED GASKET FOR UTILITY LIGHT FIXTURES

(71) Applicant: Craig Maurice Smith, Sharpsburg, GA (US)

(72) Inventor: Craig Maurice Smith, Sharpsburg, GA (US)

(73) Assignee: Eaton Intelligent Power Limited, Dublin (IE)

( * ) Notice: Subject to any disclaimer, the term of this patent is extended or adjusted under 35 U.S.C. 154(b) by 108 days.

(21) Appl. No.: 15/260,179

(22) Filed: Sep. 8, 2016

(51) Int. Cl.
*F21V 31/00* (2006.01)
*F16L 5/10* (2006.01)
*F21W 131/10* (2006.01)

(52) U.S. Cl.
CPC .............. *F21V 31/005* (2013.01); *F16L 5/10* (2013.01); *F21W 2131/10* (2013.01)

(58) Field of Classification Search
CPC ...... F21V 31/005; F16L 5/10; F21W 2131/10
USPC ................ 277/603, 606–609, 616, 634–636; 52/199, 58
See application file for complete search history.

(56) References Cited

U.S. PATENT DOCUMENTS

| | | | | |
|---|---|---|---|---|
| 2,510,362 A * | 6/1950 | Anderson | ............... | F16D 3/224 464/175 |
| 3,205,760 A * | 9/1965 | Seckerson | ............. | B60R 13/005 411/548 |
| 3,566,738 A * | 3/1971 | Cupit | ................... | E04D 3/3606 411/369 |
| 3,893,919 A * | 7/1975 | Flegel | ................. | E04D 13/0409 210/166 |
| 3,977,137 A * | 8/1976 | Patry | .................... | E04D 13/1407 285/42 |
| 4,120,129 A * | 10/1978 | Nagler | ................ | E04D 13/1407 285/4 |
| 4,333,660 A * | 6/1982 | Cupit | .................. | E04D 13/1476 277/630 |
| 4,449,554 A * | 5/1984 | Busse | ................... | F16L 59/161 137/375 |
| 4,469,467 A * | 9/1984 | Odill | ....................... | E02D 29/14 277/607 |
| 4,519,793 A * | 5/1985 | Galindo | ................ | A61M 25/02 128/DIG. 26 |
| 4,625,469 A * | 12/1986 | Gentry | .................. | E04D 3/3601 52/3 |
| 4,664,390 A * | 5/1987 | Houseman | .......... | E04D 13/1476 277/606 |
| D294,177 S * | 2/1988 | Sherlock | ...................... | D25/158 |
| D312,506 S * | 11/1990 | Schalle | ........................ | D25/199 |
| 5,010,700 A * | 4/1991 | Blair | ................... | E04D 13/1476 285/42 |

(Continued)

FOREIGN PATENT DOCUMENTS

WO    WO-2006128790 A1 * 12/2006 ............. F24C 15/00

*Primary Examiner* — Eugene G Byrd
(74) *Attorney, Agent, or Firm* — King & Spalding LLP

(57) ABSTRACT

An integrated gasket that provides both wildlife protection and ingress protection in a light fixture. The integrated gasket comprises a body that extends from a top annular edge to a bottom annular edge and defines a through cavity. The body includes a bottom flanged portion and a top pipe receiving portion. The top pipe receiving portion includes a first pipe portion and a second pipe portion that are detachably coupled. Further, the body includes a wiper flange that extends radially inward from the bottom annular edge towards the internal through cavity.

20 Claims, 15 Drawing Sheets

(56) References Cited

U.S. PATENT DOCUMENTS

| | | | | |
|---|---|---|---|---|
| 5,018,748 A * | 5/1991 | Schalle | ............... | E04D 13/1476 277/634 |
| 5,176,408 A * | 1/1993 | Pedersen | ............. | E04D 13/1407 285/419 |
| 5,347,776 A * | 9/1994 | Skoff | ................. | E04D 13/1476 52/199 |
| D364,933 S * | 12/1995 | Schalle | ........................ | D25/199 |
| 5,588,267 A * | 12/1996 | Rodriguez | ......... | E04D 13/1476 285/4 |
| 5,624,123 A * | 4/1997 | Meyers | ..................... | E03F 5/02 277/604 |
| 5,701,634 A * | 12/1997 | Uemura | ................... | F16L 5/10 16/2.1 |
| 5,703,154 A * | 12/1997 | Davis | ................... | C08K 5/0025 524/525 |
| 6,185,885 B1 * | 2/2001 | Thaler | ................ | E04D 13/1407 285/42 |
| 6,409,178 B1 * | 6/2002 | Raden | ................... | F02F 11/002 277/317 |
| 6,752,176 B1 * | 6/2004 | Price | ..................... | F16L 59/166 138/109 |
| 6,866,271 B2 * | 3/2005 | MacDonald | ......... | F16J 15/3276 277/353 |
| 7,021,878 B1 * | 4/2006 | Albertson | ................ | B27F 7/00 403/27 |
| 7,140,618 B2 * | 11/2006 | Valls, Jr. | ................ | F16L 21/03 277/609 |
| D585,968 S * | 2/2009 | Elkins | ........................ | D23/259 |
| 2004/0262854 A1 * | 12/2004 | Matczak | ................... | F16L 5/10 277/635 |
| 2005/0055889 A1 * | 3/2005 | Thaler | ................. | E04D 13/1476 52/58 |
| 2005/0115019 A1 * | 6/2005 | Sanroma | ............. | B60R 16/0222 16/2.1 |
| 2006/0186607 A1 * | 8/2006 | Shih | ........................ | F16J 3/045 277/634 |
| 2007/0143956 A1 * | 6/2007 | Kumakura | ................ | F16L 5/10 16/2.2 |
| 2008/0092844 A1 * | 4/2008 | Tsukamoto | ............... | F16L 5/10 123/195 C |
| 2009/0218132 A1 * | 9/2009 | Delakowitz | ............... | F16L 5/10 174/669 |
| 2009/0235484 A1 * | 9/2009 | Bringhenti | .......... | B60R 16/0222 16/2.2 |
| 2013/0075980 A1 * | 3/2013 | Yamamoto | ............. | F16J 15/025 277/591 |
| 2014/0338616 A1 * | 11/2014 | Foos | ........................ | F16L 5/10 123/41.14 |

* cited by examiner

US 10,378,752 B1

INTEGRATED GASKET FOR UTILITY LIGHT FIXTURES

TECHNICAL FIELD

The present disclosure relates generally to lighting fixtures, and in particular to an integrated gasket for providing a wildlife barrier and ingress protection in utility light fixtures.

BACKGROUND

Ingress protection (IP) rating of a light fixture defines a level of sealing effectiveness of an electrical enclosure or housing of the light fixture against intrusion from dust, dirt, and/or moisture. In addition to preventing intrusion from dust, dirt, and moisture, some light fixtures may also have to be protected from wildlife intrusion, for example, outdoor lighting fixtures.

Multiple sealing technologies that provide wildlife intrusion protection and IP may exist. However, the existing multiple sealing technologies may have limited functionality. That is, a sealing technology that provides wildlife intrusion protection may not provide IP and vice-versa. Accordingly, each type of protection may require a different sealing device, thereby increasing the number of stock keeping units (SKUs). The increased number of SKUs may be inconvenient for a manufacturer and/or a distributor. Also, the increased number of SKUs may increase the product cost for the end user (customer). Further, existing sealing technologies may require tools for installation which may be inconvenient for a customer.

For example, an existing sealing technology that provides wildlife intrusion protection may include a metal plate that is fastened to a housing of a light fixture using two screws, while another existing sealing technology that provides IP may include a silicone rubber that is adhered to an aluminum plate using an adhesive, which in turn is fastened to the housing using four screws. In said example, the existing sealing technology that provides wildlife protection may not be configured to provide IP and vice-versa. Accordingly, in said example, to provide IP for a light fixture that is already fitted with the metal plate for wildlife intrusion protection, a customer may have to remove the metal plate, drill two additional holes, and attach the aluminum plate using four screws. This process may require tools, such as drills, screws, etc., and may be tedious and time consuming.

Furthermore, the existing sealing technologies may not be configured to allow a pole mounting of the light fixture. Even if some of the existing sealing technologies allow pole mounting of the light fixture, they may not be configured to accommodate mounting poles of different sizes and/or the various mounting angles of the mounting poles.

In light of the above mentioned shortcomings, there remains a need for an improved sealing technology that can provide both wildlife intrusion protection and IP for different mounting angles and/or different sizes of mounting poles. Further, there remains a need for a sealing technology that allows toolless installation.

SUMMARY

In one aspect, the present disclosure can relate to an integrated gasket. The integrated gasket includes a top annular edge, a bottom annular edge, and a body that defines an internal through cavity and extends between the top annular edge and the bottom annular edge. The body includes a bottom flanged portion that is configured to couple the integrated gasket to a housing of a light fixture. Further, the body includes a top pipe receiving portion that is disposed above and abutting the bottom flanged portion. The top pipe receiving portion includes a first pipe portion that is disposed abutting the bottom flanged portion. The first pipe portion is configured to receive a first mounting pipe therethrough such that the first pipe portion creates a first seal around at least a portion of on outer surface of the first mounting pipe. Further, the top pipe receiving portion includes a second pipe portion that is disposed above and detachably coupled to the first pipe portion. The second pipe portion is configured to receive a second mounting pipe therethrough such that the second pipe portion creates a second seal around at least a portion of an outer surface of the second mounting pipe. The first mounting pipe is larger in diameter than the second mounting pipe. Furthermore, the integrated gasket includes a wiper flange that extends radially inward towards the internal through cavity from the bottom annular edge. The wiper flange is configured to engage one of the first mounting pipe and the second mounting pipe to provide an additional seal when the first mounting pipe or the second mounting pipe is disposed through the internal through cavity of the integrated gasket.

In another aspect, the present disclosure can relate to an integrated gasket. The integrated gasket includes a body that extends between a top edge and a bottom edge. The body includes a bottom flanged portion that is configured to couple the integrated gasket to a housing of a light fixture. Further, the body includes a top pipe receiving portion that is disposed above and abutting the bottom flanged portion. The top pipe receiving portion includes a first pipe portion that is disposed abutting the bottom flanged portion and configured to receive a first mounting pipe therethrough such that the first pipe portion creates a first seal around at least a portion of the first mounting pipe. Further, the top pipe receiving portion includes a second pipe portion that is disposed above the first pipe portion. The second pipe portion is configured to receive a second mounting pipe therethrough such that the second pipe portion creates a second seal around at least a portion of the second mounting pipe. The second pipe portion is detachably coupled to the first pipe portion. Further, the first mounting pipe is larger in diameter than the second mounting pipe.

These and other aspects, objects, features, and embodiments will be apparent from the following description and the appended claims.

BRIEF DESCRIPTION OF THE DRAWINGS

The foregoing and other features and aspects of the disclosure are best understood with reference to the following description of certain example embodiments, when read in conjunction with the accompanying drawings, wherein.

Figure 1:
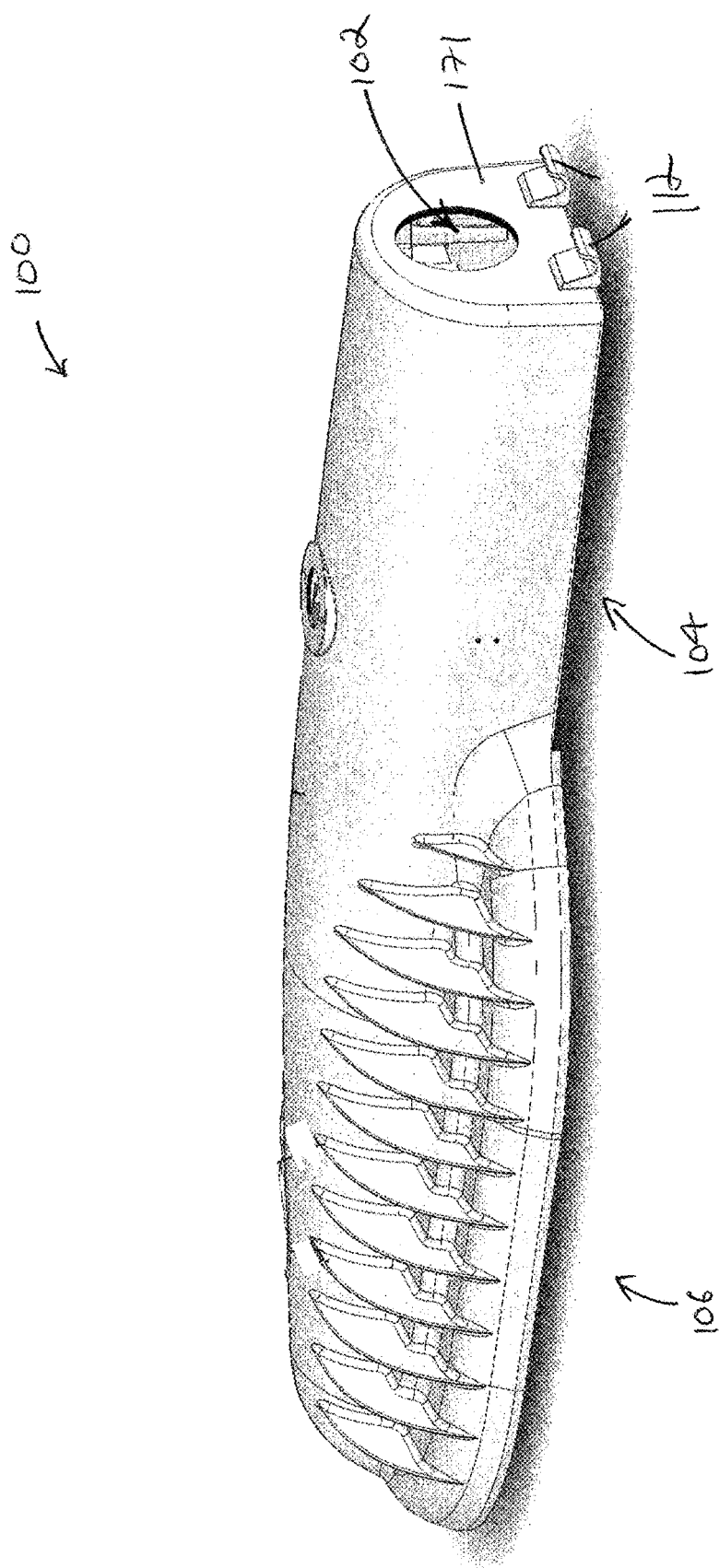
FIG. 1 illustrates a perspective view of a light fixture housing, in accordance with an example embodiment of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

A sealing technology of the present invention includes an example integrated gasket. The example integrated gasket may be a one piece gasket that provides both wildlife intrusion protection as well as ingress protection in a light fixture that is pole mounted at any appropriate mounting angle of a mounting pole. Further, the integrated gasket is configured to accommodate mounting poles of different sizes. In particular, the example integrated gasket includes a flanged portion that allows a toolless installation of the integrated gasket on the light fixture, i.e., the integrated gasket may be secured to a housing of the light fixture without the use of fasteners. For example, the example integrated gasket of the present disclosure is installed in the light fixture by way of a flange style seal (provided by the flanged portion) around a given wall thickness and hole diameter of the light fixture's housing, where the hole in the light fixture's housing is configured to receive a mounting pole therethrough. Further, the integrated gasket includes a pole receiving portion that abuts the flanged portion. The pole receiving portion of the example integrated gasket receives a mounting pole therethrough such that it provides a seal over and around the mounting pole. Furthermore, the example integrated gasket includes a wiper flange that provides additional sealing (e.g., IP sealing). Additionally, the example integrated gasket has an off center design that allows adjustability/flexibility for sealing at different mounting angles of the mounting pole with the light fixture. The integrated gasket is also modifiable to receive and seal mounting poles of different sizes.

Technology of the present disclosure can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "example embodiments" given herein are intended to be non-limiting and among others supported by representations of the present technology.

Figure 2:
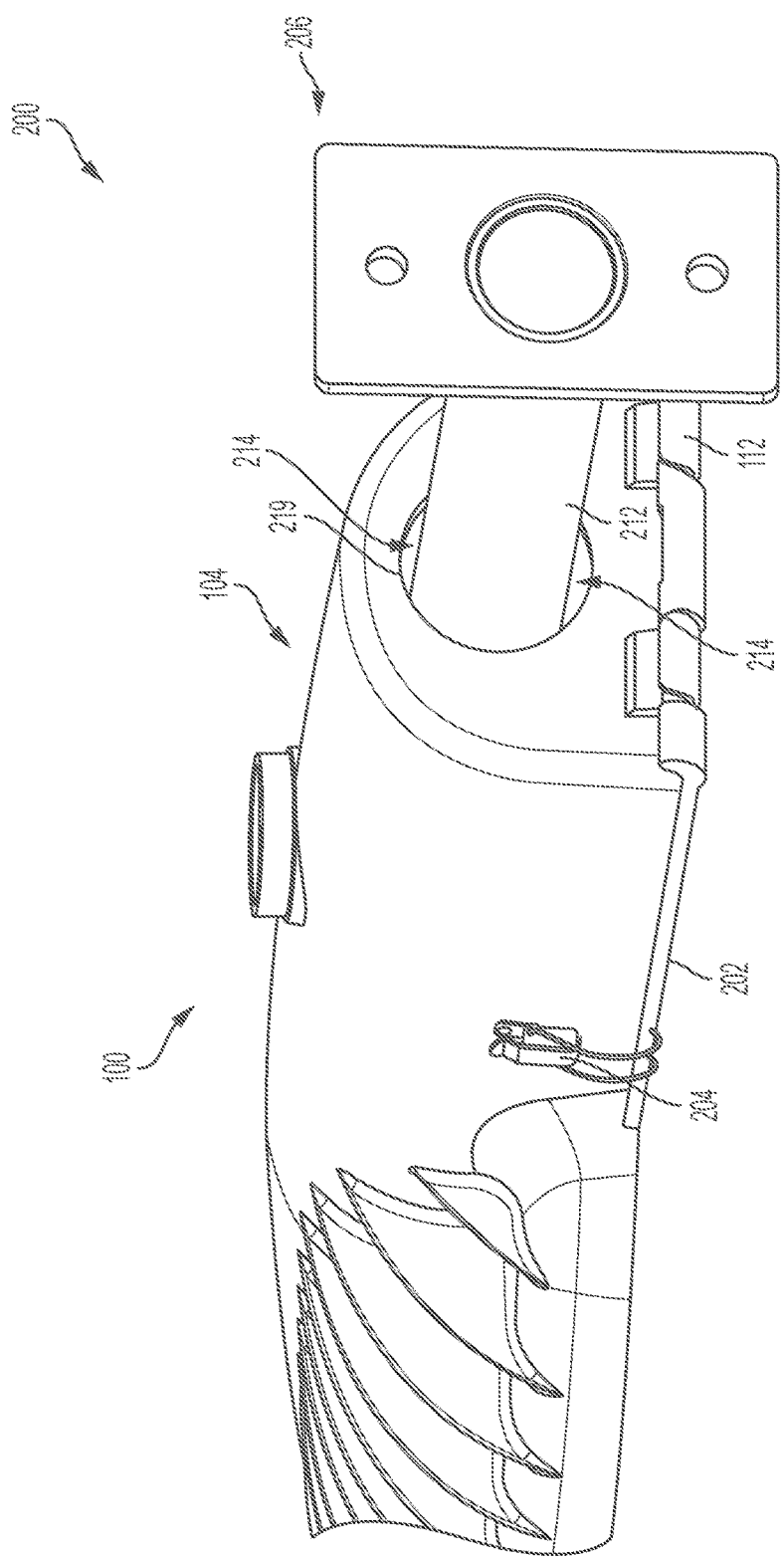
FIG. 2 illustrates a perspective view of the light fixture of FIG. 1 that is pole mounted to a mounting pole without an integrated gasket, in accordance with an example embodiment of the present disclosure.

Moving now to discuss the figures, FIG. 1 illustrates a perspective view of a light fixture housing, in accordance with an example embodiment of the present disclosure; and FIG. 2 illustrates a perspective view of the light fixture of FIG. 1 that is pole mounted to a mounting pole without an integrated gasket, in accordance with an example embodiment of the present disclosure. Referring to FIGS. 1-2, a light fixture 200 may include a housing 100 (herein 'light fixture housing 100') that has a light module portion 106 that is configured to house one or more light sources (not shown). Further, the light fixture housing 100 may have an electrical component portion 104 that is disposed adjacent to and abuts the light module portion 106.

Figure 15:
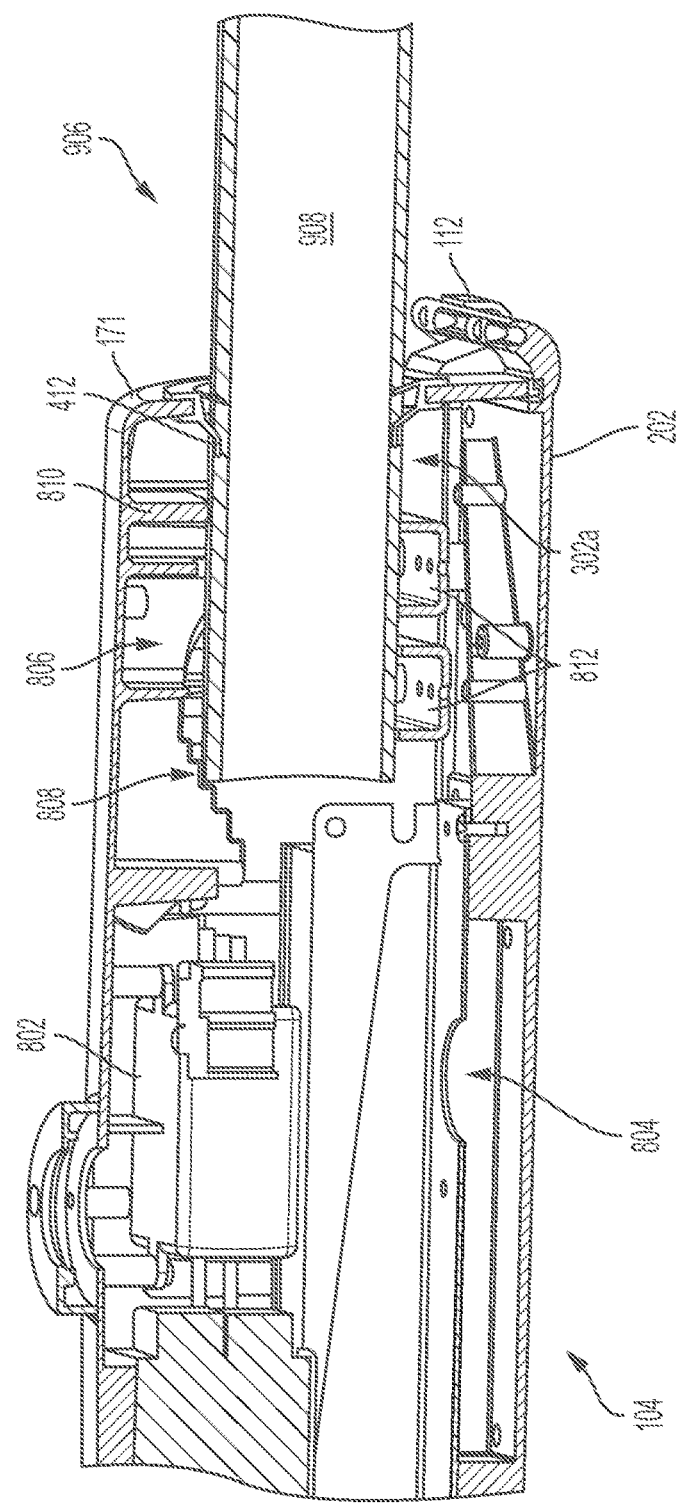
FIG. 15 illustrates a cross sectional view of the light fixture of FIG. 9 with the mounting pole and modified integrated gasket, in accordance with an example embodiment of the present disclosure.

In particular, the electrical component portion 104 may define a component cavity 804 (shown in FIGS. 8 and 15) that may be configured to house one or more electrical components 802 (shown in FIG. 15), such as, LED drivers, ballast, sensors, etc., that are associated with the operation of the one or more light sources. Further, the electronic component portion 104 may define a mounting cavity 806 (shown in FIGS. 8 and 15) positioned between the component cavity 804 and a rear wall 171 of the light fixture housing 100. The mounting cavity 806 may be configured to couple a mounting pole 206 (or 906 (as shown in FIG. 15)) to the light fixture housing 100 and adjust a mounting angle of a mounting pole 206 (or 906). In certain example embodiments, the mounting cavity 806 may include one or more features that are configured to assist with coupling the mounting pole 206 (or 906) to the light fixture housing 100 and/or adjusting a mounting angle of the mounting pole 206 (or 906) with the light fixture housing 100. For example, the mounting cavity 806 may include a stairway shaped portion 808 (shown in FIGS. 8 and 15) that may be configured to receive one end of a mounting pole 206 (or 906) and adjust a mounting angle of the mounting pole 206 (or 906) with the light fixture housing 100 by moving the mounting pole 206 (or 906) along the stairway shaped portion 808. For example, moving the mounting pole 206 (or 906) from one stair to another of the stairway shaped portion 808 may change the mounting angle of the mounting pole 206 (or 906) by X degrees (e.g., 2.5 degrees, 5 degrees, etc.). Further, the mounting cavity 806 may include a rib 810 that supports the mounting pole 206 at a top portion and acts as a pivot about which the mounting pole 206 (or 906) may be rotated to adjust the mounting angle of the mounting pole 206. Furthermore, the mounting cavity 806 may include one or more support brackets 812 that support the mounting pole 206 (or 906) at a bottom portion and securely retain the mounting pole 206 within the light fixture housing 100. Even though the present disclosure describes one or more features of the mounting cavity 806, one of ordinary skill in the art can understand and appreciate that in other example embodiments, the mounting cavity 806 may include fewer or more features to couple the mounting pole to the light fixture housing and to change a mounting angle of the mounting pole without departing from a broader scope of the present disclosure.

As illustrated in FIGS. 1 and 2, the mounting pole 206, i.e., particularly, a cylindrical pipe 212 of the mounting pole 206 may enter the mounting cavity 806 through an annular opening 102 in the rear wall 171 of the light fixture housing 100. The annular opening 102 may be in communication with the mounting cavity 806 and the components cavity 804 defined by the electronic component portion 104.

Typically, a diameter of the cylindrical pipe 212 may be smaller than the diameter of the annular opening 102 in the light fixture housing 100. Therefore, a gap 214 may be formed between the cylindrical pipe 212 of the mounting pole 206 and the annular opening 102 on the rear wall 171 of the light fixture housing 100. This gap 214 may expose the electronic component portion 104 and the one or more electronic components 802 disposed therein to the external environment and one or more elements in the external environment, such as water, dust, dirt, etc. Further, in some example embodiments where the light fixture 200 is used for outdoor lighting, the gap 214 may allow wildlife, such a squirrels, bugs, insects, etc., to enter the electronic component portion 104 of the light fixture 200. Ingress of external environmental elements and/or wildlife intrusion into the electronic component portion 104 may cause damage to the electronic components disposed therein, thereby, reducing a life span of the light fixture 200. Therefore, there is a need to seal the gap 214 between the cylindrical pipe 212 (herein 'mounting pipe 212') of the mounting pole 206 and the annular opening 102 (also referred to as 'mounting pole receiving opening') of the light fixture housing 100. The present disclosure describes an integrated gasket that is configured to seal the gap 214 and provide both wildlife intrusion protection as well as ingress protection in a light fixture at any appropriate mounting angle and/or for any appropriate size of a mounting pole. The integrated gasket will be described in greater detail below in association with FIGS. 3-15.

In addition to the annular opening 102, as illustrated in FIGS. 1 and 2, the rear wall 171 of the light fixture housing 100 may further include a pair of pivot door receivers 112. The pivot door receivers 112 may be configured to hingedly couple a pivot door 202 to the light fixture housing 100 using a latch mechanism 204 as illustrated in FIG. 2. In particular, the latch mechanism 204 may be configured to hold the pivot door 202 in a closed position such that it conceals the component cavity 804 and/or the mounting cavity 806 defined by the electrical component portion 104 of the light fixture housing 100 and the one or more electrical components 802 housed therein. To open the pivot door 202 and access the one or more electronic components 802, the latch mechanism 204 may be released which in turn causes the pivot door 202 to swing open by pivoting about the pivot door receivers 112 and expose the one or more electronic components 802.

Turning to FIG. 3-15, in particular, FIGS. 3-8 will describe the integrated gasket 302 that is used to seal a gap formed between a mounting pipe 212 having a first diameter and the light fixture housing 100; and FIGS. 9-15 will describe the integrated gasket 302a that has been modified to seal a gap formed between a mounting pipe 908 (shown in FIG. 9) having a second diameter (larger than the first diameter) and the light fixture housing 100.

At the outset, it is noted that even though the present disclosure describes the integrated gasket as being configured to seal a gap 214 between the light fixture housing 100 and a mounting pipe (212 or 908) that passes through annular opening 102, one of ordinary skill in the art can understand and appreciate that in other example embodiments, the integrated gasket can be used to seal any other appropriate openings that expose the electronic components of the light fixture to the external environment and wildlife without departing from a broader scope of the present disclosure. For example, the integrated gasket may be configured to seal a conduit or wire receiving opening in the light fixture housing, if any. Further, even though the present disclosure describes the integrated gasket as being used in a light fixture that is pole mounted, one of ordinary skill in the art can understand and appreciate that the integrated gasket can be used with light fixtures having any other appropriate mounting mechanism to seal a gap between the mounting mechanism and the light fixture without departing from a broader scope of the present disclosure.

Furthermore, even though the present disclosure describes an annular shaped opening in the rear wall of the light fixture housing to receive a cylindrical mounting pipe, one of ordinary skill in the art can understand and appreciate that in other example embodiments, the mounting pipe and the opening in the light fixture may have any other appropriate geometric or non-geometric shape without departing from a broader scope of the present disclosure. For example, the opening may have a square shape and the mounting pipe may have a square cross-sectional profile. In other examples, the opening and the mounting pipe may have shapes that are different from each other.

Additionally, even though the present disclosure describes a light fixture having a specific shape and structure, one of one of ordinary skill in the art can understand and appreciate that in other example embodiments, any other appropriate light fixture having a different shape and structure may be used without departing from a broader scope of the present disclosure. For example, in another embodiment, the opening in the light fixture housing that leads into the electronic component portion of the light fixture housing may be located on the side of or on top of the light fixture housing 100 rather that at the rear wall 171.

Figure 4:
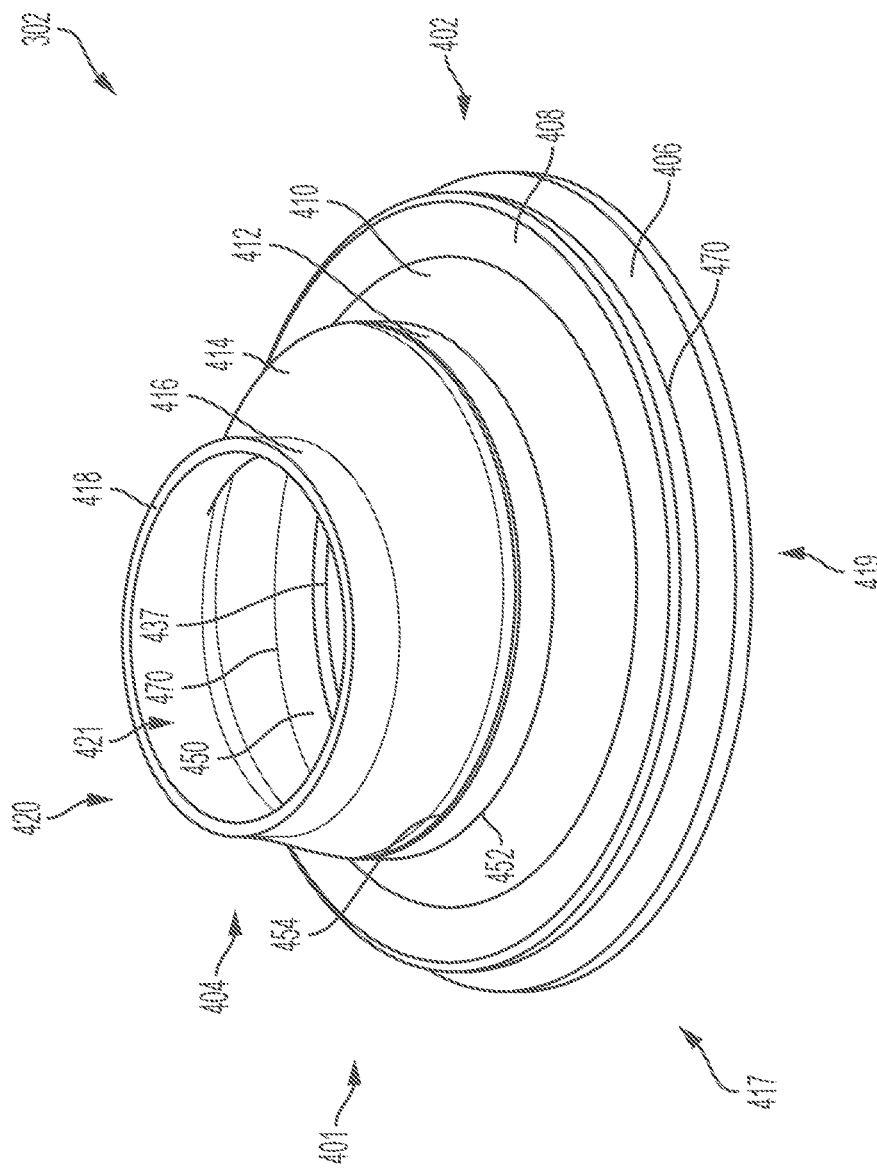
FIG. 4 illustrates a perspective view of the integrated gasket of FIG. 3, in accordance with an example embodiment of the present disclosure.
Figure 5:
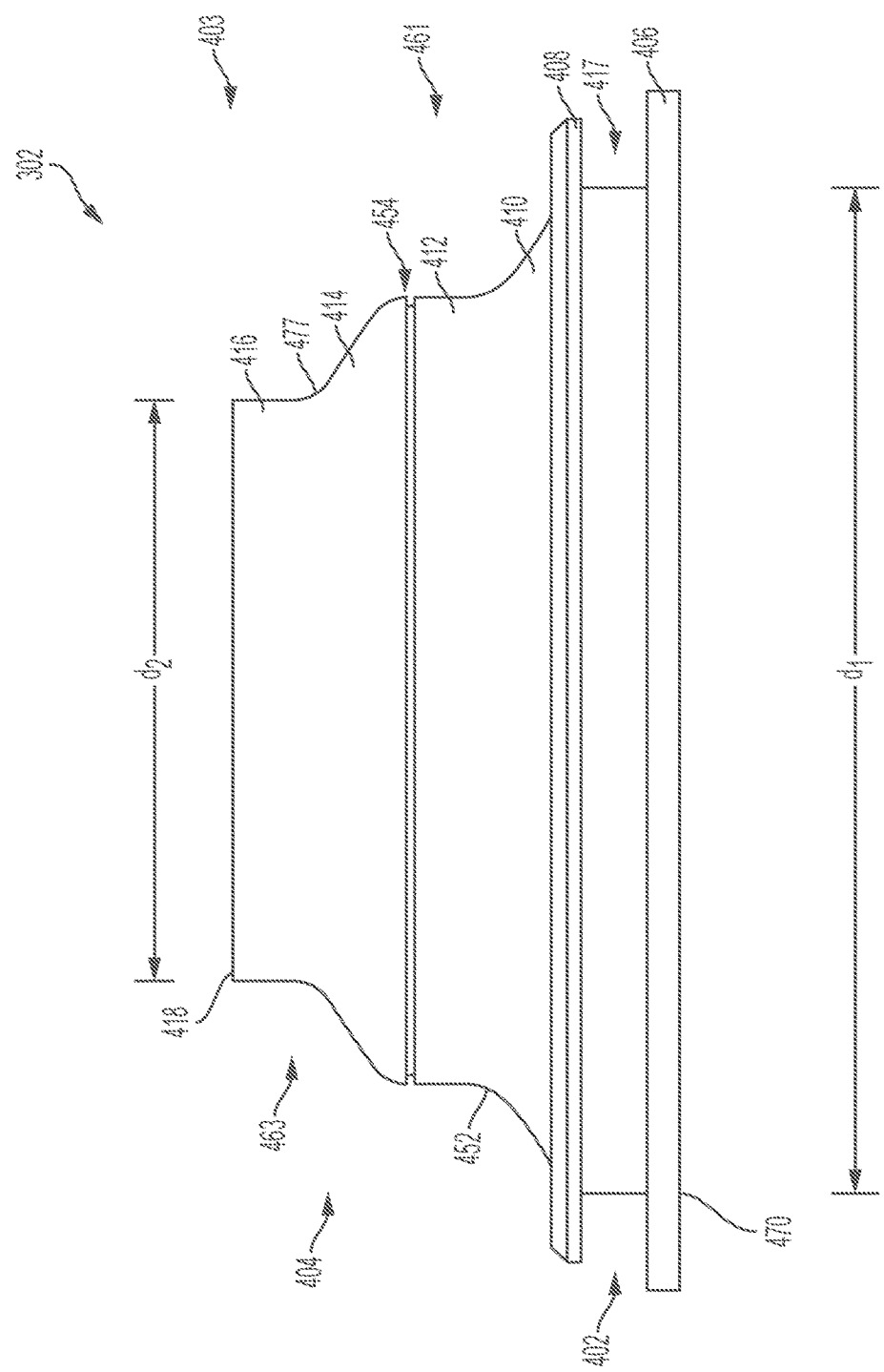
FIG. 5 illustrates a side view of the integrated gasket of FIG. 4, in accordance with an example embodiment of the present disclosure.
Figure 6:
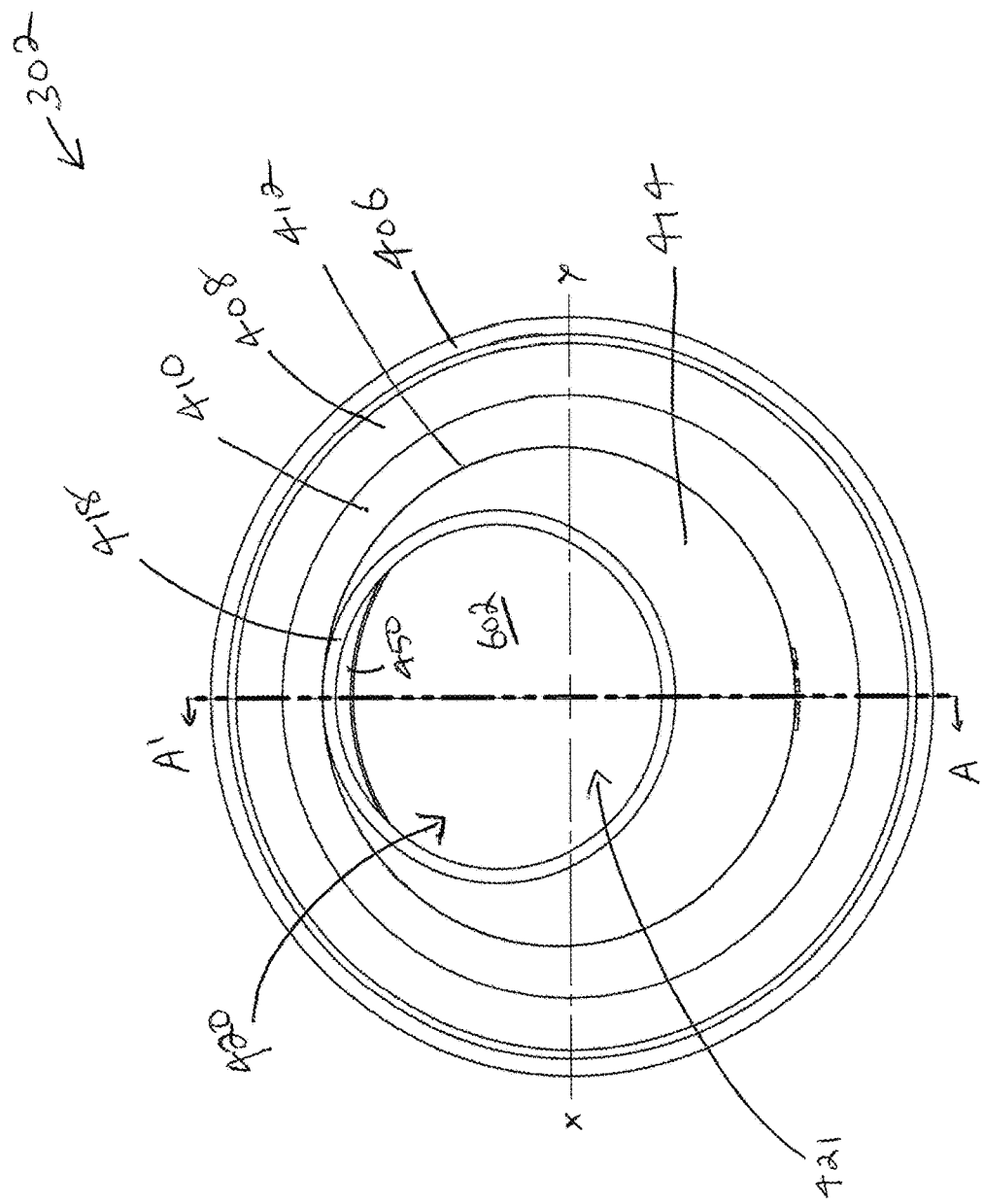
FIG. 6 illustrates a top view of the integrated gasket of FIG. 4, in accordance with an example embodiment of the present disclosure.
Figure 7:
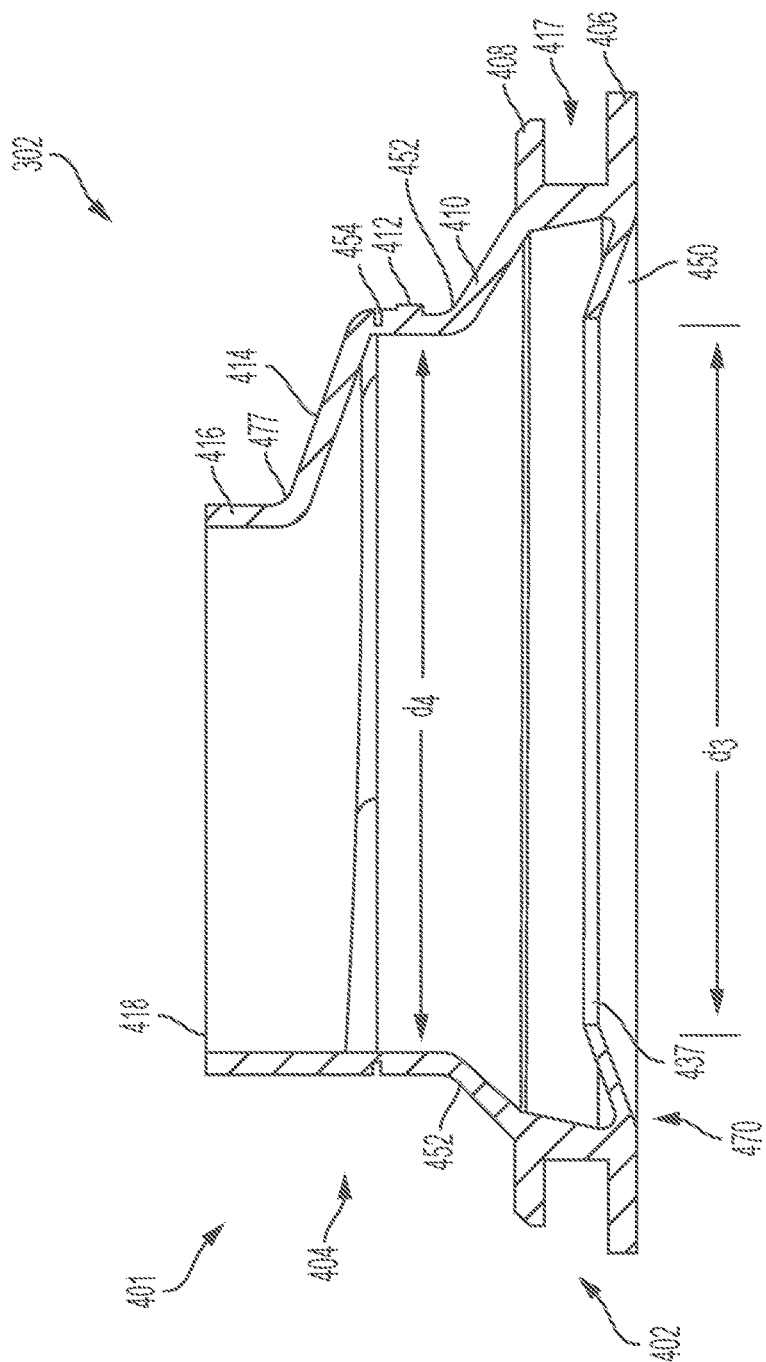
FIG. 7 illustrates a cross-sectional view of the integrated gasket of FIG. 4 along the A-A' axis as shown in FIG. 6, in accordance with an example embodiment of the present disclosure.
Figure 8:
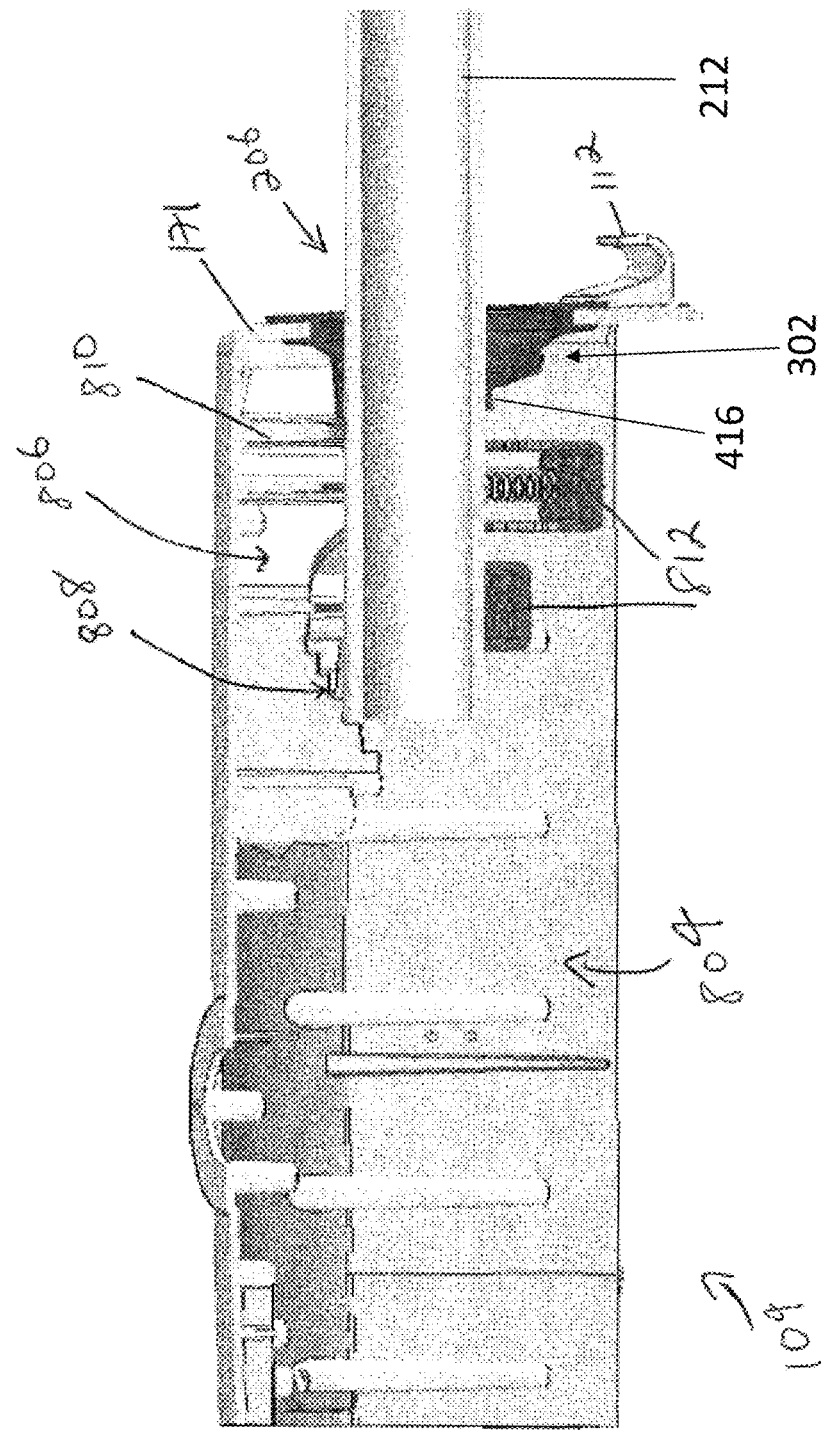
FIG. 8 illustrates a cross sectional view of the light fixture of FIG. 3 with the mounting pole and the integrated gasket, in accordance with an example embodiment of the present disclosure.
Figure 9:
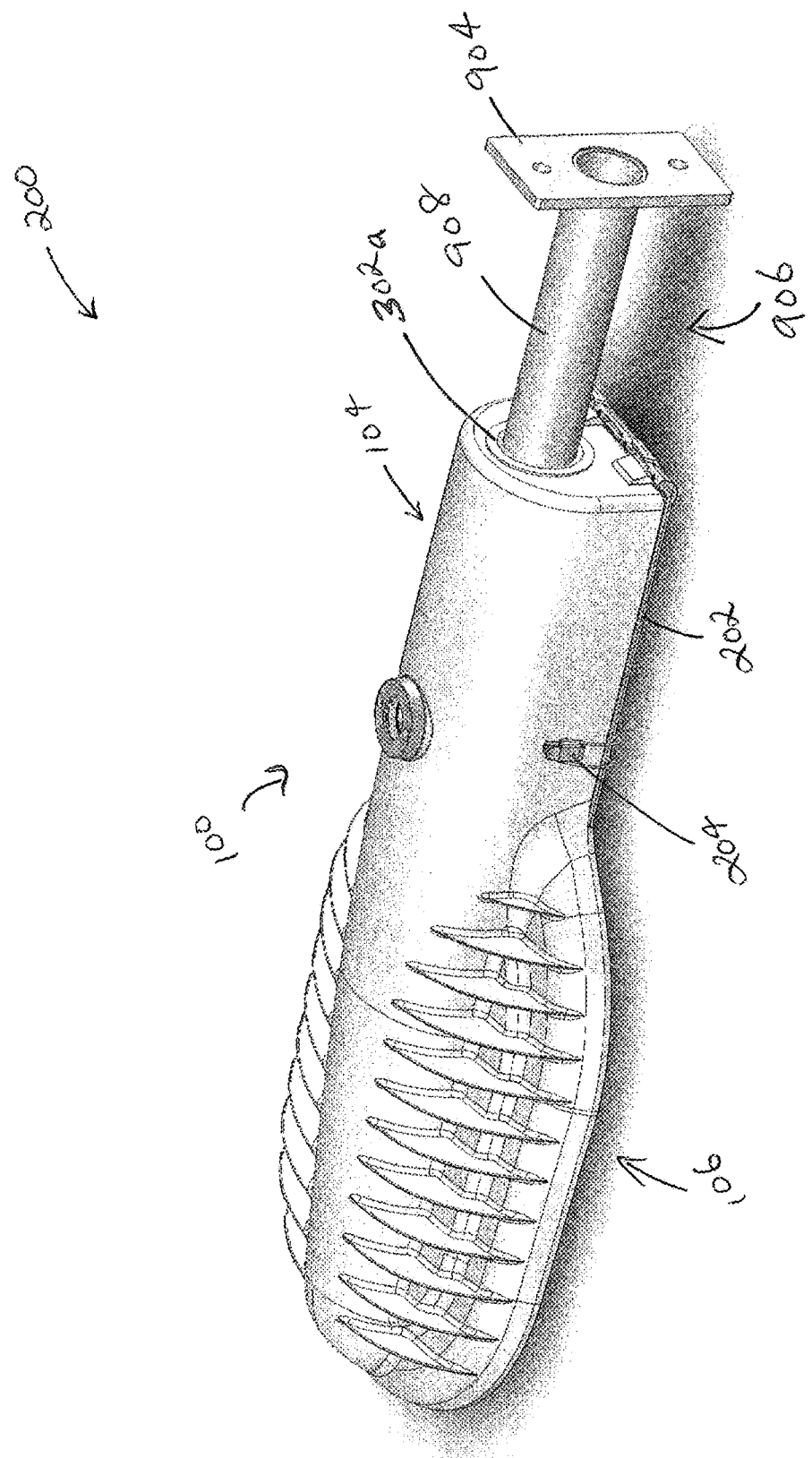
FIG. 9 illustrates a perspective view of the light fixture of FIG. 1 with the integrated gasket of FIG. 3 that is modified to seal a gap between the mounting pole of a second diameter (greater than the first diameter) and the light fixture housing, in accordance with an example embodiment of the present disclosure.
Figure 10:
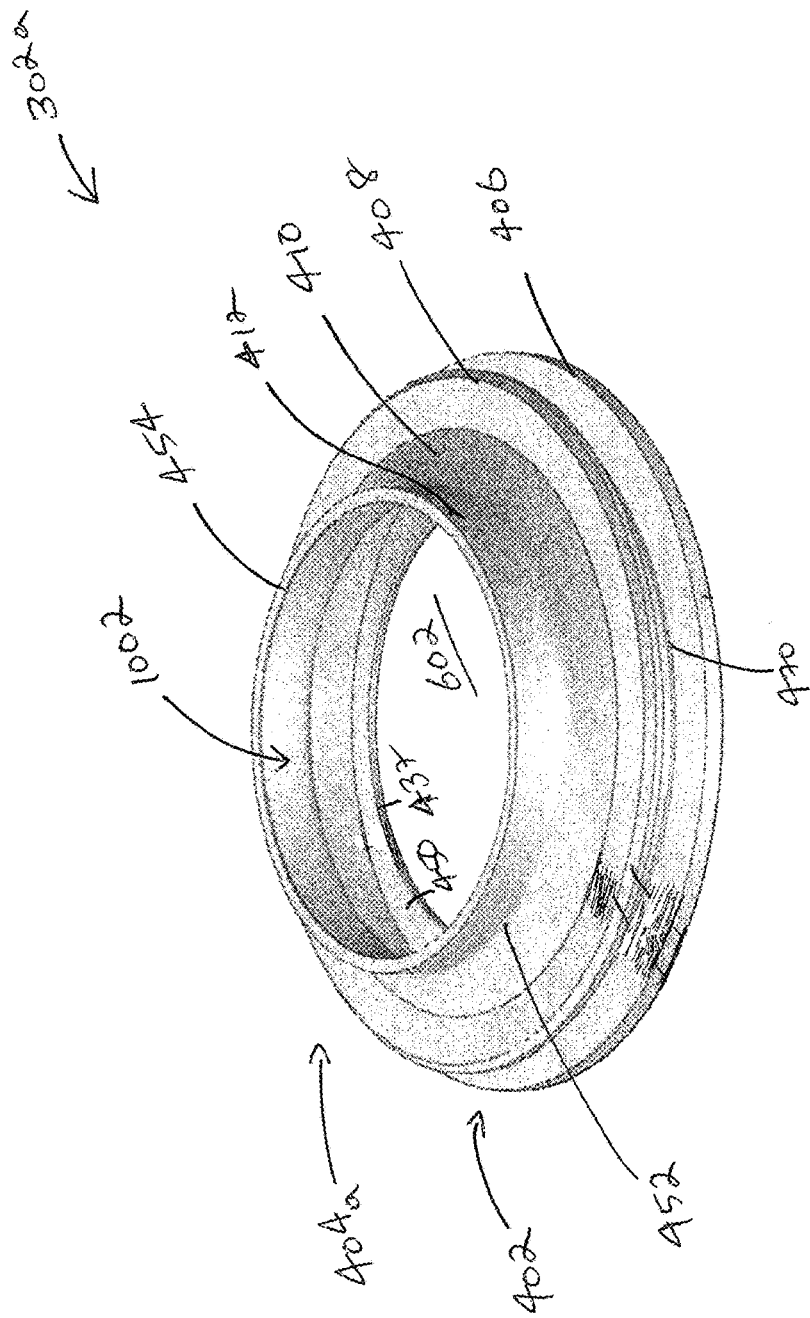
FIG. 10 illustrates a perspective view of the modified integrated gasket of FIG. 9, in accordance with an example embodiment of the present disclosure.
Figure 11:
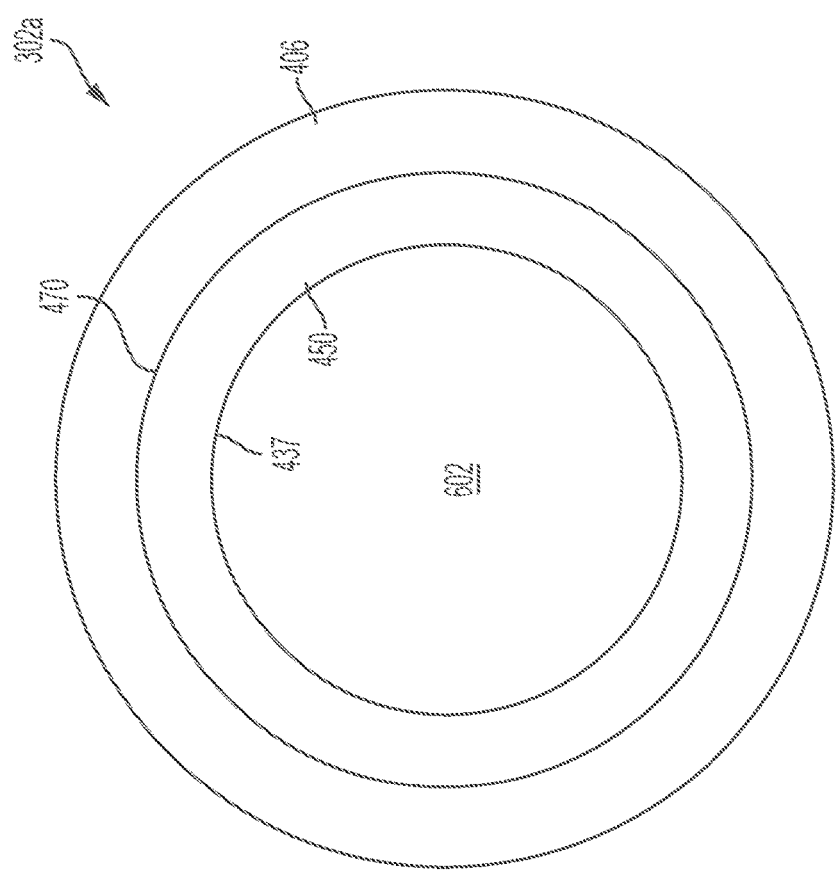
FIG. 11 illustrates a bottom view of the modified integrated gasket of FIG. 9, in accordance with an example embodiment of the present disclosure.
Figure 12:
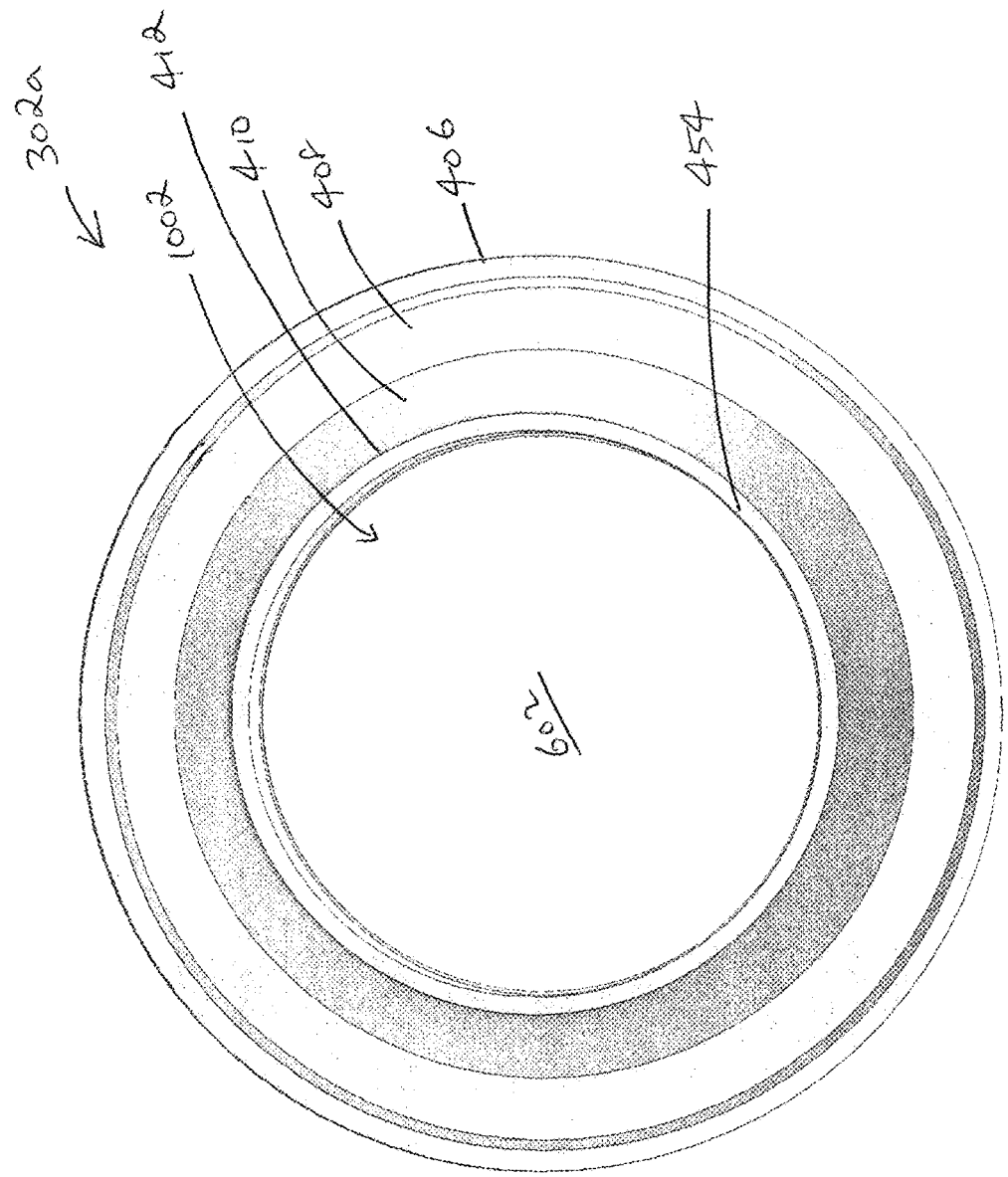
FIG. 12 illustrates a top view of the modified integrated gasket of FIG. 9, in accordance with an example embodiment of the present disclosure.
Figure 13:
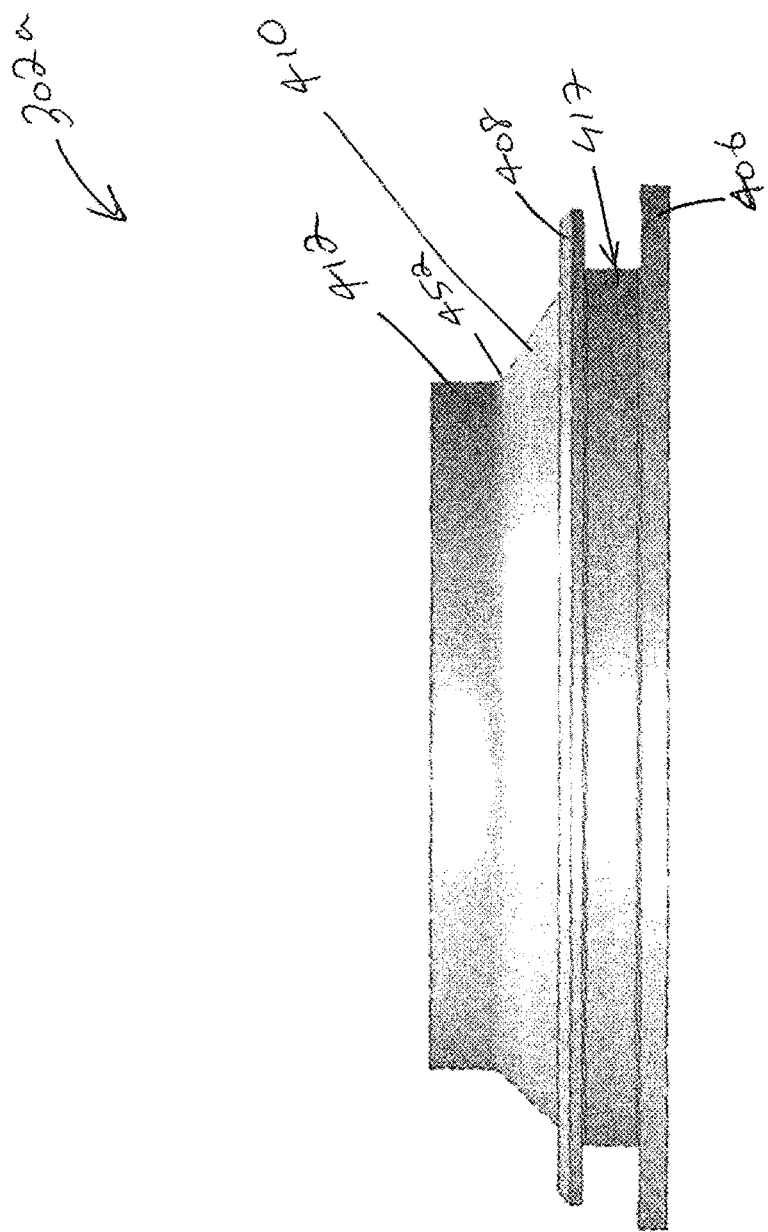
FIG. 13 illustrates a side view of the modified integrated gasket of FIG. 9, in accordance with an example embodiment of the present disclosure.
Figure 14:
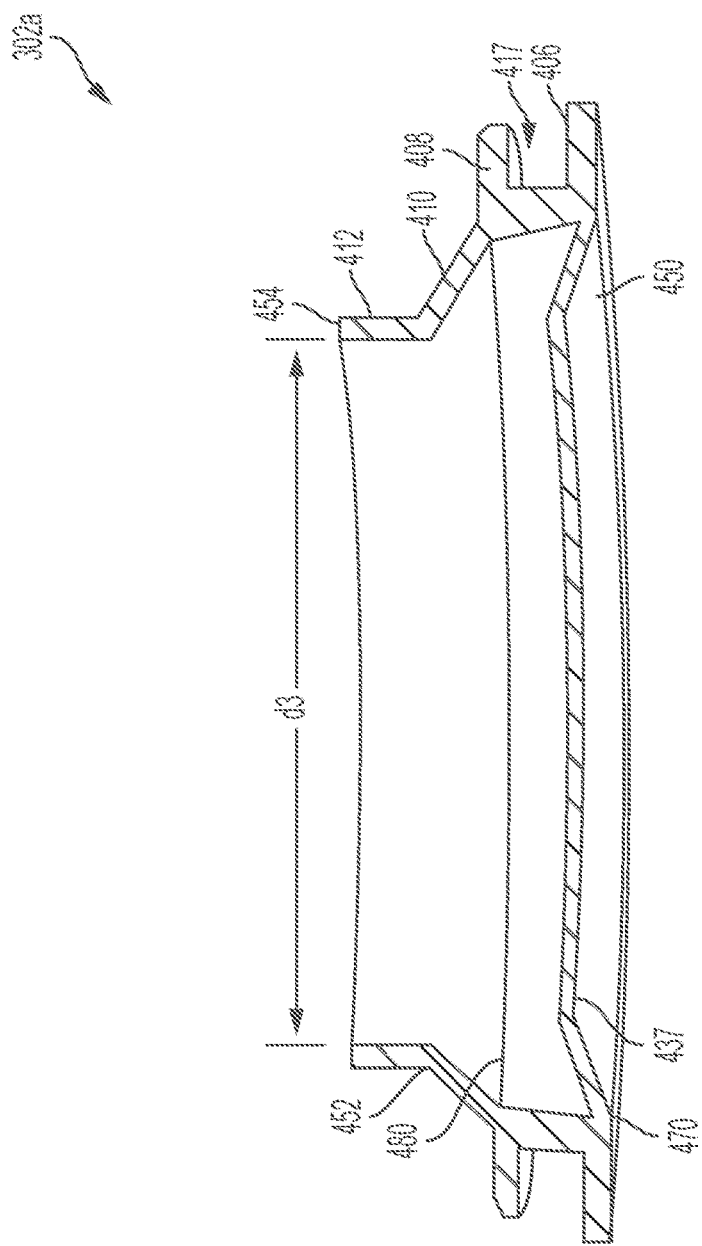
FIG. 14 illustrates a cross-sectional view of the modified integrated gasket of FIG. 9, in accordance with an example embodiment of the present disclosure.

Moving now to describe FIGS. 3-15, FIG. 3 illustrates a perspective view of the light fixture of FIG. 1 with an integrated gasket sealing a gap between the mounting pole having a first diameter and the light fixture housing, in accordance with an example embodiment of the present disclosure; FIG. 4 illustrates a perspective view of the integrated gasket of FIG. 3, in accordance with an example embodiment of the present disclosure; FIG. 5 illustrates a side view of the integrated gasket of FIG. 4, in accordance with an example embodiment of the present disclosure; FIG. 6 illustrates a top view of the integrated gasket of FIG. 4, in accordance with an example embodiment of the present disclosure; FIG. 7 illustrates a cross-sectional view of the integrated gasket of FIG. 4 along the A-A' axis as shown in FIG. 6, in accordance with an example embodiment of the present disclosure; FIG. 8 illustrates a cross sectional view of the light fixture of FIG. 3 with the mounting pole and the integrated gasket, in accordance with an example embodiment of the present disclosure; FIG. 9 illustrates a perspective view of the light fixture of FIG. 1 with the integrated gasket of FIG. 3 that is modified to seal a gap between the mounting pole of a second diameter (greater than the first diameter) and the light fixture housing, in accordance with an example embodiment of the present disclosure; FIG. 10 illustrates a perspective view of the modified integrated gasket of FIG. 9, in accordance with an example embodiment of the present disclosure; FIG. 11 illustrates a bottom view of the modified integrated gasket of FIG. 9, in accordance with an example embodiment of the present disclosure; FIG. 12 illustrates a top view of the modified integrated gasket of FIG. 9, in accordance with an example embodiment of the present disclosure; FIG. 13 illustrates a side view of the modified integrated gasket of FIG. 9, in accordance with an example embodiment of the present disclosure; FIG. 14 illustrates a cross-sectional view of the modified integrated gasket of FIG. 9, in accordance with an example embodiment of the present disclosure; and FIG. 15 illustrates a cross sectional view of the light fixture of FIG. 9 with the mounting pole and modified integrated gasket, in accordance with an example embodiment of the present disclosure.

Referring to FIGS. 3-15, the integrated gasket 302 may have a body 401 that defines an internal cavity 421 that is configured to receive a mounting pipe 212 or 908 therethrough. The body 401 may extend from a bottom annular edge 470 of the integrated gasket 302 to a top annular edge 418 of the integrated gasket 302. In particular, the bottom annular edge 470 of the integrated gasket 302 may have a first diameter d1 that is larger than a second diameter d2 of the top annular edge 418 of the integrated gasket 302. That is, the body 401 of the integrated gasket 302 may taper from the bottom annular edge 470 towards the top annular edge 418.

Further, the body 401 of the integrated gasket 302 may include a bottom flanged portion 402 and a top pipe receiving portion 404 that is disposed above the bottom flanged portion 402. In certain example embodiments, the bottom flanged portion 402 may include a first collar 406 and a second collar 408 that are integral to the body 401. In particular, the first collar 406 extends radially outward and substantially horizontally from the bottom annular edge 470 of the integrated gasket 302. The second collar 408 may extend radially outward from the body 401 and may be disposed above the first collar 406 such that they form a groove 417 in between. Further, the second collar 408 may be substantially parallel to the first collar 406.

As illustrated in FIG. 4, the groove 417 formed in between the two collars 406 and 408 extend around the body 401 of the integrated gasket 302. Further, as illustrated in FIGS. 8 and 15, the groove 417 and the two collars 406 and 408 may be configured to provide a flange style seal around a given wall thickness and hole diameter of the rear wall 171 of the light fixture housing 100. In other words, the bottom flanged portion 402 of the integrated gasket 302 may be configured to securely retain, within the groove 417, an edge 219 of the light fixture housing 100 that defines the annular opening 102 and/or a portion of the rear wall 171 around the annular opening 102. Accordingly, the width of the groove 417 or a distance between the first collar 406 and the second collar 408 may vary based on a thickness of the rear wall 171 around the annular opening 102.

Even though the present disclosure describes the integrated gasket 302 as having two collars (406, 408) that form a groove 417 in between them, one of ordinary skill in the art can understand and appreciate that the integrated gasket may include fewer or more collars that are either integral to or removably coupled to the body of the integrated gasket without departing from a broader scope of the present disclosure. In certain example embodiments, the first collar 406 may be rigid while the second collar 408 may be flexible. However, in other example embodiments, both the first collar 406 and/or the second collar 408 may be rigid or flexible without departing from a broader scope of the present disclosure. That is, in one example, the two collars 406 and 408 or at least the second collar 408 may be flexible such that it can bend around the edge 219 of the annular opening 102 to accommodate the edge 219 and at least a portion of the rear wall 171 around the annular opening 102 within the groove 417. Furthermore, one of ordinary skill in the art can understand and appreciate that the collars 406 and/or 408 may or may not be made using the same material as the body 401 of the integrated gasket 302.

Further, even though the present disclosure describes the integrated gasket as having two collars and a groove in between the two collars to engage and seal an annular opening in the light fixture housing, one of ordinary skill in the art can understand and appreciate that in other example embodiments, the collars and the groove formed in between the collars may be configured to engage and seal an opening of any other shape without departing from a broader scope of the present disclosure. For example, in some embodiments, the collars (406,408) and/or the groove 417 may be square in shape such that they can engage and seal a square shaped opening in the light fixture housing.

In addition to the two collars (406, 408), the bottom flanged portion 402 may include a wiper flange 450 that extends radially inward towards the internal cavity 421 and upwards at an angle from the bottom annular edge 470 of the integrated gasket 302. An annular outer edge 437 of the wiper flange 450, i.e., the edge of the wiper flange that is away from the bottom annular edge 470 of the integrated gasket 302, may define a bottom circular opening 602 having a third diameter d3 that is lesser than the first diameter d1 of the bottom annular edge 470 and greater than the second diameter d2 of the top annular edge 418. The bottom circular opening 602 defined by the annular outer edge 437 of the wiper flange 450 may be configured to receive a mounting pipe 212 or 908 therethrough such that that wiper flange 450 engages at least a portion of an outer surface of the mounting pipe 212 or 908 to provide a first layer of ingress protection against water, dust, dirt, and/or other appropriate elements of the external environment. In some example embodiments, the outer edge 437 of the wiper flange 450 may include an additional lip portion that extends further upwards to provide extended engagement with the outer surface of the mounting pipe 212 or 908 for additional sealing from one or more elements of the external environment. In certain example embodiments, the wiper flange 450 may be flexible, while, in other example embodiments, the wiper flange 450 may be rigid.

As described above, in addition to the bottom circular opening 602 defined by the wiper flange 450, the integrated gasket 302 may include a top circular opening 420 that is defined by the top annular edge 418 of the integrated gasket 302. In certain example embodiments, the top circular opening 420 and the bottom circular opening 602 may not be co-centric. That is, the center of the top circular opening 420 may be offset from a center (an axis that is normal to the integrated gasket 302 and passing through the center of the bottom circular opening 602) of an integrated gasket 302. However, in other example embodiments, the top circular opening 420 and the bottom circular opening 602 may be aligned such that they are concentric.

Further, as described above, in addition to the bottom flanged portion 402, the integrated gasket body 401 may include a top pipe receiving portion 404 that is disposed above the bottom flanged portion 402. As illustrated in FIGS. 4, 5, and 7, the top pipe receiving portion may extend between the top annular edge 418 of the integrated gasket body 401 and the second collar 408 of the bottom flanged portion 402. Further, the top pipe receiving portion 404 of the integrated gasket body 401 may include a first pipe portion 461, and a second pipe portion 463 that is disposed above and abutting the first pipe portion 461. The first pipe portion 461 may be configured to receive and seal a first cylindrical mounting pipe 908 while the second pipe portion 463 may be configured to receive and seal a second cylindrical mounting pipe 212, where the first cylindrical mounting pipe 908 (herein 'mounting pipe 908') is larger in diameter than the second cylindrical mounting pipe 212 (herein 'mounting pipe 212'). Further, the first pipe portion 461 and a second pipe portion 463 may intersect at an edge 454 that is perforated to allow the second pipe portion 463 to be detached from the first pipe portion 461 for accommodating the mounting pipe 908 having the larger diameter. That is, as illustrated in FIGS. 9-15, to receive and seal the mounting pipe 908, the integrated gasket 302 may be modified by detaching a second pipe portion 461 from the first pipe portion 463 such that the top pipe receiving portion 404a of the resulting modified integrated gasket 302a may include only the first pipe portion 461. In particular, the second pipe portion 461 may be detached from the first pipe portion 463 by tearing or cutting along the perforated edge 454 that partially attaches the first pipe portion 461 to the second pipe portion 463. However, as illustrated in FIGS. 3-8, to receive and seal the second cylindrical mounting pipe 212, the second pipe portion 463 may be left intact, i.e., partially attached to the first pipe portion 461 via the perforated edge 454.

As illustrated in FIGS. 3-8, the first pipe portion 461 may include a first cylindrical portion 412 disposed above the second collar 408. The first cylindrical portion 412 may have a fourth diameter d4 that substantially matches the third diameter d3 of the bottom circular opening 602 defined by the wiper flange 450. As shown in FIG. 15, the first cylindrical portion 412 of the integrated gasket body 401 may be configured to receive and provide a seal around the mounting pipe 908 that has a diameter that substantially matches the fourth diameter d4 of the first cylindrical portion 412. Further, the first pipe portion 461 may include a first curved portion 410 that extends radially out from a bottom end 452 of the first cylindrical portion 412 towards the second collar 408. In other words, the first curved portion 410 may join or connect the first cylindrical portion 412 with the second collar 408. In certain example embodiments, the first curved portion 410 may be shaped as a frustum and may taper from the second collar 408 towards the bottom end 452 of the first cylindrical portion 412. However, in other example embodiments, the first curved portion 410 may have any other appropriate shape without departing from a broader scope of the present disclosure.

Similar to the first pipe portion 461, the second pipe portion 463 of the top pipe receiving portion 404 may include a second cylindrical portion 416 that is disposed above the first cylindrical portion 412. The diameter of the second cylindrical portion 416 may substantially match the second diameter d2 of the top circular opening 420 defined by the top annular edge 418 of the integrated gasket body 401. As shown in FIG. 8, the second cylindrical portion 416 may be configured to receive and provide a seal around a second cylindrical mounting pipe 212 that has a diameter that substantially matches the second diameter d2.

In other words, the second cylindrical portion 416 may be used to receive a seal the mounting pipe 212 having a smaller diameter, as illustrated in FIG. 8, and the first cylindrical portion 412 of the integrated gasket body 401 may be used to receive a seal the mounting pipe 908 having a larger diameter, as illustrated in FIG. 15.

Additionally, the second pipe portion 463 may include a second curved portion 414 that extends from a bottom end 477 of the second cylindrical portion 412 towards the perforated edge 454 at a top end of the first cylindrical portion 412. In other words, the second curved portion 414 may join or connect the second cylindrical portion 416 with the first cylindrical portion 412. Further, similar to the first curved portion 410, in certain example embodiments, the second curved portion 414 may be shaped as a frustum and may taper from the perforated edge 454 at a top end of the first cylindrical portion 412 towards the bottom end 477 of the second cylindrical portion 412. However, in other example embodiments, the second curved portion 414 may have any other appropriate shape without departing from a broader scope of the present disclosure.

Referring to FIGS. 9-14, the integrated gasket 302 of FIGS. 3-8 may be modified (hereinafter 'modified integrated gasket 302a') to seal a mounting pipe 908 having a larger diameter. As described above, to form the modified integrated gasket 302a, the second pipe portion 463 may be detached from the integrated gasket body 401 by tearing or cutting along the perforated edge 454 that connects the second pipe portion 463 to the first pipe portion 461. The body 401 of the resulting modified integrated gasket 302a may extend between a top annular edge 454 that defines an intermediate circular opening 1002 to the bottom annular edge 470. The bottom flanged portion 402 of the modified integrated gasket 302a may be substantially similar to that of the integrated gasket 302. Accordingly, the description of the bottom flanged portion 402 will not be repeated herein for sake of brevity. However, the top pipe receiving portion 404a of the modified integrated gasket 302a may be different from the top pipe receiving portion 404 of the integrated gasket 302 in that the top pipe receiving portion 404a of the modified integrated gasket 302a may only include the first pipe portion 461. The first pipe portion 461 of the modified integrated gasket 302a may be substantially similar to that of the integrated gasket 302. Accordingly, the description of first pipe portion 461 will not be repeated herein for sake of brevity. In other words, the modified integrated gasket 302a may be substantially similar to the integrated gasket 302 except for the top pipe receiving portion 404. Furthermore, as illustrated in FIGS. 3-15, the bottom annular opening 602 defined by the wiper flange 450 may be concentric with the intermediate opening 1002.

In certain example embodiments, the body 401 of the integrated gasket 302 may be formed using a flexible material that is compressible and/or resilient, such as rubber, plastic, elastomers, etc. Other example materials such as, but not limited to, silicone, metal, cork, felt, neoprene, nitrile rubber, fiberglass, polytetrafluoroethylene (otherwise known as PTFE or Teflon) or a plastic polymer (such as polychlorotrifluoroethylene) may also be used to form the body 401 of the integrated gasket 302. In some example embodiments, in addition to or instead of the flexible characteristic, the materials used for forming the integrated gasket may have other characteristics, such as waterproof characteristic, thermal resistance characteristic, etc., without departing from a broader scope of the present disclosure.

Further, even though the present disclosure describes the integrated gasket as having a top annular edge that defines a top circular opening, a bottom annular edge, and a wiper flange that has an annular outer edge defining a bottom circular opening to receive a cylindrical mounting pipe therethrough, one of ordinary skill in the art can understand and appreciate that in other example embodiments, the top edge, the bottom edge, and the wiper flange edge of the integrated gasket may have any other geometric or non-geometric shape without departing from a broader scope of the present disclosure. For example, in some embodiments, the top edge, the bottom edge, and the wiper flange edge of the integrated gasket may be square or rectangular in shape. Further, the openings defined by the top edge and the wiper blade edge may be square or rectangular in shape to receive a square or rectangular shaped mounting pipe therethrough. In other words, the shape of the top edge 418, the bottom edge 470, and the wiper flange edge 437 may designed based on the shape of the mounting pipe and/or the opening in the light fixture housing.

Furthermore, even though the present disclosure describes the integrated gasket as having a first and second cylindrical portions for receiving and sealing a cylindrical mounting pipes of different diameters, one of ordinary skill in the art can understand and appreciate that the first and second cylindrical portions may be replaced by portions having any other geometric or non-geometric shapes based on the shape of the mounting pipes that are to be sealed using the integrated gasket without departing from a broader scope of the present disclosure. Even though the shape of various portions of the integrated gasket may vary based on the shape of the mounting pipe and the opening in the light fixture housing, the resulting integrated gasket may remain functionally similar to the integrated gasket described herein. That is, the integrated gasket may provide both wildlife intrusion protection and ingress protection at different mounting angles of a mounting pipe and for mounting pipes having different sizes. Further, the integrated gasket may have a detach feature that allows a user to tear or cut off a portion of the integrated gasket body to receive and seal a mounting pipe having a larger diameter.

Additionally, even though the present disclosure describes the integrated gasket as having various portions, one of ordinary skill in the art can understand and appreciate that in other example embodiments, the integrated gasket may have fewer or more portions without departing from a broader scope of the present disclosure. For example, in some embodiments, the integrated gasket may not include the wiper flange 450 or may have more than one wiper flange 450. In yet another example, the integrated gasket may not include one or more of the collars 406 and 408. Instead, the integrated gasket may be coupled to the light fixture housing 100 using other mounting mechanisms.

Figure 3:
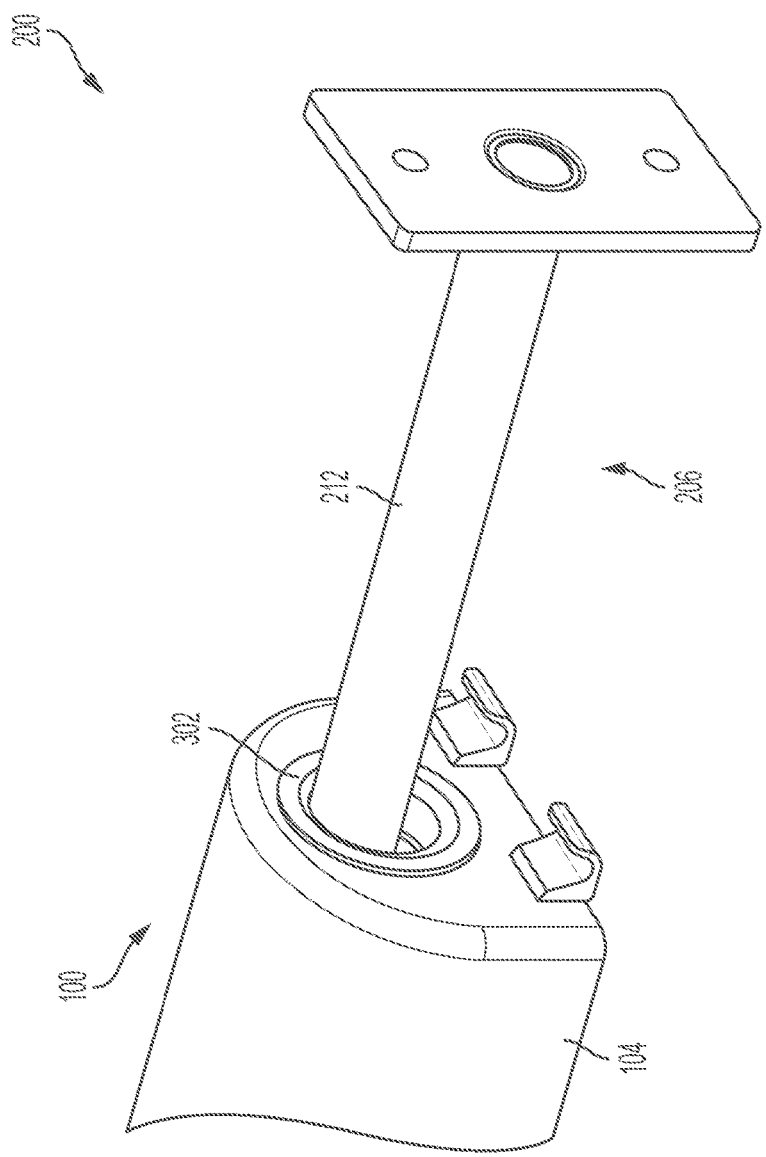
FIG. 3 illustrates a perspective view of the light fixture of FIG. 1 with an integrated gasket sealing a gap between the mounting pole having a first diameter and the light fixture housing, in accordance with an example embodiment of the present disclosure.

Moving now to describe FIGS. 8 and 15, FIG. 8 illustrates a cross sectional view of the light fixture of FIG. 3 with the mounting pole 212 and the integrated gasket 302, in accordance with an example embodiment of the present disclosure; and FIG. 15 illustrates a cross sectional view of the light fixture of FIG. 9 with the mounting pole 908 and modified integrated gasket 302a, in accordance with an example embodiment of the present disclosure.

Referring to FIGS. 8 and 15, to seal the gap 214 between the mounting pipe 212 or 908 and the light fixture housing 100, first, depending on the diameter of the mounting pipe, the integrated gasket 302 or the modified integrated gasket 302a may be coupled to the light fixture housing 100. In particular, as described above and as illustrated in FIGS. 8 and 15, the integrated gasket 302 or the integrated gasket 302a may be coupled to the rear wall 171 of the light fixture housing 100 via the bottom flanged portion 402 of the integrated gasket 302 or the modified integrated gasket 302a such that:

(a) the edge 219 that defines the annular opening 102 of the light fixture housing 100 and a portion of the rear wall 171 surrounding the annular opening 102 is overlappingly received and secured within the groove 417 that lies in between the two collars 406 and 408 of the integrated gasket 302 or the modified integrated gasket 302a, (b) the first collar 408 engages an outer surface of the light fixture housing's rear wall 171, the second collar 406 engages an inner surface (facing the cavity defined by electronic components portion 104) of the light fixture housing's rear wall 171, (c) the top pipe receiving portion 404 of the integrated gasket 302 or the modified integrated gasket 302a passes through the annular opening 102 and is disposed inside the mounting cavity 806 of the light fixture housing's electronic components portion 104, and (d) the bottom circular opening 602 defined by the wiper flange 450 is concentric with the annular opening 102.

In some embodiments, at least one collar, e.g., the second collar 408 may flex to pass through the annular opening 102. It is noted that the process of coupling the integrated gasket 302 or the modified integrated gasket 302a to the light fixture housing 100 does not use any tools. Instead, the integrated gasket 302 or the modified integrated gasket 302a is pushed into the annular opening 102 till the edge 219 of the annular opening 102 engages and is securely retained within the groove 417 between the collars 406 and 408 of the bottom flanged portion. That is, the integrated gasket 302 or the modified integrated gasket 302a may be configured to toollessly couple with the light fixture housing 100.

Once the integrated gasket 302 or the modified integrated gasket 302a is toollessly coupled to the light fixture housing 100, the mounting pipe 212 or 908, respectively, may be axially aligned with the bottom circular opening 602 of the integrated gasket 302 or the modified integrated gasket 302a attached to the light fixture housing 100. Then, the mounting pipe 212 or 908 may be pushed into the mounting cavity 806 of the light fixture housing 100 (from outside the light fixture housing 100) through the bottom circular opening 602 of the integrated gasket 302 or the modified integrated gasket 302a.

In the case of the integrated gasket 302, as illustrated in FIG. 8, the mounting pipe 212 that enters the integrated gasket 302 through the bottom circular opening 602 may exit into the mounting cavity 806 of the light fixture housing 100 through the top circular opening 420 of the integrated gasket 302 such that an inner surface of the second cylindrical portion 416 of the top pipe receiving portion 404 engages the outer surface of the mounting pipe 212 to provide a seal on the mounting pipe 212 for protection against wildlife intrusion and ingress of other environmental elements. However, in the case of the modified integrated gasket 302a, as illustrated in FIG. 15, the mounting pipe 908 that enters the integrated gasket 302 through the bottom circular opening 602 may exit into the mounting cavity 806 of the light fixture housing 100 through the intermediate circular opening 1002 of the modified integrated gasket 302a such that an inner surface of the first cylindrical portion 412 of the top pipe receiving portion 404 engages the outer surface of the mounting pipe 908 to provide a seal on the mounting pipe 908 for protection against wildlife intrusion and ingress of other environmental elements.

Further, in both the cases, the wiper flange 450 of the integrated gasket 302 or the modified integrated gasket 302a may engage the mounting pipe 212 or 908 as illustrated in FIGS. 8 and 15 to provide an additional protection or seal. In particular, the additional protection or seal of the wiper flange 450 provides a first level of intrusion prevention against wildlife and/or external environmental elements, such as dust, water, etc., before the wildlife and/or external environmental elements reaches the seal formed by the first cylindrical portion 412 or second cylindrical portion 416.

Furthermore, as described above, the mounting pipe 212 or 908 that exits the integrated gasket 302 or the modified integrated gasket 302a into the mounting cavity 806 may engage the stairway shaped portion 808 in the mounting cavity 806. That is, once the integrated gasket 302 or the modified integrated gasket 302a is coupled to the light fixture housing 100 as described above, the mounting pipe 212 or 908 is pushed into the mounting cavity 806 of the light fixture housing 100 through the integrated gasket 302 or the modified integrated gasket 302a till the mounting pipe 212 or 908 engages the stairway shaped portion 808 in the mounting cavity 806. Then, depending on the installation conditions and requirements, a user may adjust the mounting angle of the mounting pipe 212 or 908 by moving the mounting pipe 212 or 908 along the stairs of the stairway shaped portion 808. As the mounting pipe 212 or 908 is moved along the stairs of the stairway shaped portion 808, the integrated gasket 302 or the modified integrated gasket 302a (at least the top pipe receiving portion 404) that is made of flexible material may flex or bend to accommodate the different mounting angles desired by the user while still providing the wildlife intrusion protection and ingress protection.

Although the disclosure provides example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. An integrated gasket comprising:
a top annular edge;
a bottom annular edge;
a body that defines an internal through cavity and that extends between the top annular edge and the bottom annular edge, the body being configured to receive one of a first mounting pipe and a second mounting pipe therethrough at a given time, wherein the first mounting pipe is larger in diameter than the second mounting pipe, wherein the body comprises:
a bottom flanged portion that is configured to couple the integrated gasket to a housing of a light fixture; and
a top pipe receiving portion disposed above and abutting the bottom flanged portion, wherein the top pipe receiving portion comprises:
a first pipe portion disposed abutting the bottom flanged portion and comprising a first cylindrical portion that is configured to receive the first mounting pipe therethrough such that the first cylindrical portion creates a first seal around at least a portion of an outer surface of the first mounting pipe when the first mounting pipe is received therethrough, and
a second pipe portion disposed above and detachably coupled to the first pipe portion, wherein the second pipe portion comprises a second cylindrical portion that is configured to receive the second mounting pipe therethrough such that the second cylindrical portion creates a second seal around at least a portion of an outer surface of the second mounting pipe when the second mounting pipe is received therethrough, and
wherein a center of the first cylindrical portion of the first pipe portion is offset from a center of the second cylindrical portion of the second pipe portion; and
a wiper flange that extends radially inward towards the internal through cavity from the bottom annular edge and is configured to engage one of the first mounting pipe and the second mounting pipe to provide an additional seal.

2. The integrated gasket of claim 1, wherein first seal, the second seal, and the third seal provide a wildlife intrusion protection and an ingress protection for the light fixture.

3. The integrated gasket of claim 1, wherein the bottom flanged portion comprises:
a first collar that extends radially outward and horizontally from the bottom annular edge;
a second collar that is disposed at a distance above the first collar such that a groove is formed between the first collar and the second collar.

4. The integrated gasket of claim 3, wherein the second collar extends radially outward from the body and is parallel to first collar.

5. The integrated gasket of claim 3:
wherein the housing of the light fixture defines an opening that leads into an electrical component housing portion of the light fixture and is configured to receive the first mounting pipe and/or the second mounting pipe therethrough to pole mount the light fixture, and
wherein the bottom flanged portion of the integrated gasket is configured to couple the integrated gasket to the housing of the light fixture by receiving, within the groove, an edge of the housing of the light fixture that defines the opening.

6. The integrated gasket of claim 3, wherein the bottom flanged portion of the integrated gasket is configured to couple the integrated gasket to the housing of the light fixture such that: (a) the first collar is disposed on an outer surface of the housing, (b) the second collar is disposed on an inner surface of the housing, (c) an edge of the housing that defines an opening extending from the outer surface through the inner surface and leading to an electrical component housing portion of the light fixture is disposed between the first collar and the second collar, and (d) the top pipe receiving portion is disposed inside the electrical component housing portion of the light fixture.

7. The integrated gasket of claim 1, wherein an outer annular edge of the wiper flange defines a bottom annular opening having a first diameter, wherein the top annular edge defines a top annular opening, and wherein the body of the integrated gasket defines an internal cavity that extends from the top annular opening to the bottom annular opening.

8. The integrated gasket of claim 7, wherein a center of the top annular opening defined by the top annular edge of the integrated gasket is offset from a center of the bottom annular opening defined by the outer annular edge of the wiper flange.

9. The integrated gasket of claim 7, wherein the bottom annular opening is concentric with the first cylindrical portion of the first pipe portion, and wherein a center of the bottom annular opening is offset from the center of the second cylindrical portion of the second pipe portion.

10. The integrated gasket of claim 1, wherein a portion of the body where the first pipe portion is detachably coupled to the second pipe portion is perforated.

11. The integrated gasket of claim 7, wherein the first cylindrical portion of the first pipe portion of the integrated gasket has a second diameter that is substantially similar to the first diameter of the bottom annular opening defined by the outer annular edge of the wiper flange such that when the first mounting pipe is disposed through the internal cavity of the integrated gasket:
the first cylindrical portion circumferentially engages the outer surface of the first mounting pipe to create the first seal around the outer surface of the first mounting pipe at a first portion of the first mounting pipe, and
the wiper flange circumferentially engages the outer surface of the first mounting pipe to create a third seal around the outer surface of the first mounting pipe at a second portion of the first mounting pipe,
wherein to couple the first mounting pole to the housing of the light fixture through the integrated gasket, the second pipe portion of the integrated gasket is detached from the first pipe portion such that the body of the resulting integrated gasket extends between an annular edge at a top end of the first pipe portion and the bottom annular edge, and
wherein the second cylindrical portion of the second pipe portion of the integrated gasket has a third diameter that is smaller than the first diameter of the bottom annular opening and the second diameter of the first cylindrical portion such that when the second mounting pipe is disposed through the internal cavity of the integrated gasket:
the second cylindrical portion circumferentially engages an outer surface of the second mounting pipe to create the second seal around the outer surface of the second mounting pipe at a first portion of the second mounting pipe,
at least a portion of the first cylindrical portion engages the outer surface of the second mounting pipe at a second portion of the second mounting pipe, and
the wiper flange engages the outer surface of the second mounting pipe at a third portion of the second mounting pipe.

12. The integrated gasket of claim 11, wherein the annular edge at the top edge of the first pipe portion defines an intermediate annular opening that is concentric with a bottom annular opening defined by the wiper flange when the second pipe portion is detached from the first pipe portion to receive the first mounting pipe.

13. The integrated gasket of claim 1, wherein the body of the integrated gasket is made using a flexible material that allows the first mounting pipe and/or the second mounting pipe to be mounted at different mounting angles with respect to the housing of the light fixture.

14. An integrated gasket comprising:
a body that extends between a top edge and a bottom edge, the body being configured to receive one of a first mounting pipe and a second mounting pipe therethrough at a given time, wherein the first mounting pipe is larger in diameter than the second mounting pipe, wherein the body comprises:
a bottom flanged portion that is configured to couple the integrated gasket to a housing of a light fixture; and
a top pipe receiving portion disposed above and abutting the bottom flanged portion, wherein the top pipe receiving portion comprises:
a first pipe portion disposed abutting the bottom flanged portion and comprising a first cylindrical portion that is configured to receive a first mounting pipe therethrough such that the first cylindrical portion creates a first seal around at least a portion of the first mounting pipe when the first mounting pipe is received therethrough, and
a second pipe portion disposed above the first pipe portion and comprising a second cylindrical portion that is configured to receive a second mounting pipe therethrough such that the second cylindrical portion creates a second seal around at least a portion of the second mounting pipe when the second mounting pipe is received therethrough,
wherein the second pipe portion is detachably coupled to the first pipe portion, and
wherein a center of the first cylindrical portion of the first pipe portion is offset from a center of the second cylindrical portion of the second pipe portion.

15. The integrated gasket of claim 14, further comprising a wiper flange that extends radially inward from the bottom edge towards an internal through cavity defined by the body such that an outer annular edge of the wiper flange defines a bottom annular opening of the integrated gasket, the bottom annular opening having a first diameter.

16. The integrated gasket of claim 15:
wherein the first seal and the second seal provide a wildlife intrusion protection and an ingress protection for the light fixture, and
wherein when the second mounting pipe is disposed through the integrated gasket:
the second cylindrical portion of the second pipe portion circumferentially engages the second mounting pipe at a first location on the second mounting pipe to create the second seal, at least a portion of the first cylindrical portion of the first pipe portion engages at least a portion of the second mounting pipe at a second location on the second mounting pipe, and at least a portion of the wiper flange engages at least a portion of the second mounting pipe at a third location on the second mounting pipe.

17. The integrated gasket of claim 14, wherein the bottom flanged portion comprises:

a first collar that extends radially outward and horizontally from the bottom edge; and a second collar that is disposed at a distance above the first collar such that a groove is formed between the first collar and the second collar.

18. The integrated gasket of claim 17, wherein the second collar extends radially outward from the body and is parallel to first collar.

19. The integrated gasket of claim 14, wherein a portion of the body where the first pipe portion is detachably coupled to the second pipe portion is perforated.

20. The integrated gasket of claim 14, wherein to couple the first mounting pole to the housing of the light fixture, the second pipe portion is detached from the first pipe portion such that the body of the resulting integrated gasket extends between a top end of the first pipe portion and the bottom edge.

* * * * *